United States Patent
Stenfelt et al.

(10) Patent No.: US 9,380,460 B2
(45) Date of Patent: Jun. 28, 2016

(54) METHOD AND SYSTEM FOR CORRELATING AUTHENTICATION, AUTHORIZATION AND ACCOUNTING SESSIONS

(75) Inventors: John Stenfelt, Göteborg (SE); Dirk Kopplin, Ytterby (SE); Hans Mattsson, Bollebygd (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 583 days.

(21) Appl. No.: 12/740,419

(22) PCT Filed: Mar. 10, 2008

(86) PCT No.: PCT/SE2008/050263
§ 371 (c)(1),
(2), (4) Date: Apr. 29, 2010

(87) PCT Pub. No.: WO2009/058067
PCT Pub. Date: May 7, 2009

(65) Prior Publication Data
US 2010/0311392 A1  Dec. 9, 2010

Related U.S. Application Data

(60) Provisional application No. 60/984,423, filed on Nov. 1, 2007.

(51) Int. Cl.
| | |
|---|---|
| *H04M 1/60* | (2006.01) |
| *H04W 12/06* | (2009.01) |
| *H04L 29/06* | (2006.01) |
| *H04L 29/08* | (2006.01) |

(52) U.S. Cl.
CPC .............. *H04W 12/06* (2013.01); *H04L 63/08* (2013.01); *H04L 63/0892* (2013.01); *H04L 67/14* (2013.01); *H04L 67/141* (2013.01)

(58) Field of Classification Search
CPC ..... H04L 63/08; H04L 63/0892; H04L 67/14; H04L 67/141; H04W 12/06
USPC ................ 455/411, 406, 432.1, 435.1, 435.2; 713/168, 169, 155; 705/30, 44, 67
See application file for complete search history.

(56) References Cited

U.S. PATENT DOCUMENTS

| | | | |
|---|---|---|---|
| 8,155,128 B2 | 4/2012 | Balyan et al. | |
| 2004/0213172 A1* | 10/2004 | Myers et al. | 370/313 |

(Continued)

FOREIGN PATENT DOCUMENTS

| | | |
|---|---|---|
| WO | WO 2007/026268 A | 3/2007 |
| WO | WO 2007025905 A1 * | 3/2007 |
| WO | WO 2007/090463 A | 8/2007 |

OTHER PUBLICATIONS

3GPP. Digital Cellular Telecommunications System (Phase 2+): Universal Mobile Telecommunications System (UMTS); Policy and Charging Control Architecture (3GPP TS 23.203 version 7.4.0 Release 7). 3GPP TS 23.203 version 7.4.0. Oct. 2007.

*Primary Examiner* — Thai Vu

(57) ABSTRACT

The present invention handles Authentication, Authorization and Accounting (AAA) applications in an efficient manner. The present invention is a session aware Diameter relay agent that correlates sessions that require binding and relay sessions to the same AAA server, such as a Policy and Charging Rules Function (PCRF) server. In one embodiment, the relay agent may be arranged to select a Diameter server and forward the user equipment (UE) request to the respective server while registering the server selection. The Diameter server may be a PCRF server.

17 Claims, 9 Drawing Sheets

(56) References Cited

U.S. PATENT DOCUMENTS

| | | | |
|---|---|---|---|
| 2005/0149754 A1* | 7/2005 | Rasanen | 713/201 |
| 2007/0066286 A1* | 3/2007 | Hurtta | 455/414.1 |
| 2008/0256251 A1* | 10/2008 | Huotari et al. | 709/229 |
| 2009/0041043 A1* | 2/2009 | Belling et al. | 370/401 |

\* cited by examiner

METHOD AND SYSTEM FOR CORRELATING AUTHENTICATION, AUTHORIZATION AND ACCOUNTING SESSIONS

TECHNICAL FIELD

The present invention relates to a method and system for Authentication, Authorization and Accounting in a telecommunications network.

BACKGROUND

As used herein, the following abbreviations shall have the following meanings:
AAA—Authentication, Authorization and Accounting
CN—Core Network
CRF—Charging Rules Function
EPC—Evolved Packet Core
EPS—Evolved Packet System
FBC—Flow Based Charging
GPRS—General Packet Radio Service
GSM—Global System for Mobile Communications
hPCRF—home-PCRF
IMS—IP Multimedia Subsystem
IP BS—IP Bearer Service
IPsec—IP Security
LTE—Long Term Evolution
MSISDN—Mobile Subscriber Integrated Services Digital Network Number
O&M—Operations & Maintenance
PCC—Policy and Charging Control
PCEF—Policy and Charging Enforcement Function
PCRF—Policy and Charging Rules Function
PDF—Policy Decision Function
PEP—Policy Enforcement Function
PMIP—Proxy Mobile IP
RNC—Radio Network Controller
SAE—System Architecture Evolution
SBLP—Service Based Local Policy
SCTP—Stream Control Transmission Protocol
TCP—Transport Control Protocol
TLS—Transport Layer Security
TPF—Traffic Plane Function
UE—User Equipment
UTRA—UMTS Terrestrial Radio Access Network
WCDMA—Wideband CDMA A conventional third generation (3G) UMTS network is typically divided into three interacting domains; a Core Network (CN), a UMTS Terrestrial Radio Access Network (UTRAN) and a User Equipment (UE). The CN provide for instance switching, routing and transfer of user traffic. The CN includes databases and network management functions.

The CN architecture is based on a Global System for Mobile Communications (GSM) network with General Packet Radio Service (GPRS). The UTRAN provides the air interface access method for the UE. The Base Station used within the system is referred to as Node-B and the Node B control equipment is a Radio Network Controller (RNC).

The CN is divided in circuit switched and packet switched domains. Some of the circuit switched elements are Mobile services Switching Center (MSC), Visitor Location Register (VLR) and Gateway MSC. Packet switched elements include the Serving GPRS Support Node (SGSN) and Gateway GPRS Support Node (GGSN). Some network elements are shared by both domains.

In one example, WCDMA technology is selected as UTRAN air interface. UMTS WCDMA is a Direct Sequence CDMA system where user data is multiplied with quasi-random bits derived from WCDMA spreading codes. In UMTS, in addition to channelization, Codes are used for synchronization and scrambling. WCDMA has two basic modes of operation: Frequency Division Duplex (FDD) and Time Division Duplex (TDD).

In LTE, the basic 3G network configuration has been evolved and comprises for example, a mobility management entity/user plane entity (MME/UPE), an E-UTRAN, eNo-deB.

The Diameter protocol constitutes an Authentication, Authorization and Accounting (AAA) framework for all applications designed on top of it. The protocol is based on an open and extensible architecture that allows an implementer to define their own applications on top of the base protocol. Examples of Diameter applications include the Mobile IPv4 Application, Network Access Server Application, Extensible Authentication Protocol (EAP) Application, Credit-Control Application, and the Session Initiation Protocol Application.

There are now a number of different 3GPP specific Diameter applications used such as: the Gx-application (Rel6 and onwards), the Rx application (Rel6 and onwards), the Dx-application and the Cx-application (Rel6 and onwards), and the S7, S7a/b/c and S9 application (work in progress for Rel8).

There are different roles in a Diameter protocol based network. A client is a node at the edge of the network that request AAA services on behalf of a user. A Diameter server on the other hand performs authentication and authorization of a user on request by a client. In addition to clients and servers, the Diameter protocol introduces relay, proxy, redirect and translation agents. These agents are useful for several reasons such as load balancing and protocol translation (e.g. between RADIUS and Diameter).

Clients and servers use application sessions to exchange information. Communication is based on exchange of request/response message pairs. Both client (pull) and server-initiated (push) requests are allowed in Diameter.

Transport-wise, the Diameter protocol is based on TCP or SCTP over IP. IPSec and/or TLS could be used for hop-by-hop security, but an end-to-end security mechanism is recommended. FIG. 1 shows the Diameter protocol stack.

Session binding for 3GPP Service Based Local Policy (SBLP), Flow Based Charging (FBC) and Policy and Charging Control (PCC) is described as follows: The IP Multimedia Subsystem (IMS) was introduced into the 3GPP architecture in 3GPP Rel5. In order to support enhanced application-layer services for IMS the concept of service-based local policy (e.g. authorization and policy based control) was applied to the basic GPRS connectivity service. To enable coordination between events in the application layer and resource management in the IP bearer layer, a logical element, the Policy Decision Function (PDF), is used as a logical policy decision element.

The PDF makes decisions in regard to SBLP using policy rules, and communicates these decisions to the IP BS Manager in the GGSN, which is the IP Policy Enforcement Point (PEP) in the SBLP architecture. The PDF in Rel5 was expected to be co-located with the Proxy-CSCF. As a consequence a new interface had to be defined between the PDF and the PEP called the Go interface, as seen in FIG. 2.

Because there are networks having multiple PDFs, it was necessary to specify functionality that would let the GGSN to contact the right P-CSCF/PDF that had authorized the service at session initiation. For SBLP, this was solved through the use of a so called Authorization token. The authorization token was created by the selected P-CSCF/PDF at IM session establishment. The P-CSCF would pass the token to the UE (User Equipment) and the UE in turn would send the authorization token to the GGSN at establishment/change of a PDP-context. Part of the token is a PDF-identifier so when the GGSN received the token it could unambiguously identify the correct PDF against which to establish a Go session. The PDF could then use the authorization token to bind the Go session with the IM session (this is called session binding).

In 3GPP, Rel6 the SBLP concept was further developed. The PDF in Rel6 was no longer expected to be internal to the P-CSCF, thus a new external interface called Gq (based on the Diameter protocol) between the P-CSCF and the PDF was introduced. The authorization token was still used for SBLP, but in Rel6 the token had to be transferred from the PDF to the P-CSCF at session setup. Disadvantageously, this proved difficult to realize as support for the authorization token must be supported by the terminals. As a consequence SBLP is not widely deployed.

In parallel to the SBLP architecture, the concept of Flow Based Charging (FBC) was introduced in 3GPP Rel6. FBC introduced a new system element called the Charging Rules Function (CRF) that interacts with the P-CSCF in one end and the Traffic Plane Function (TPF) in the other. The TPF is typically a GGSN for GPRS. The interface between the P-CSCF and the CRF is called Rx and is based on the Diameter protocol. The interface between the TPF and the CRF is also based on the Diameter protocol and is called Gx. The requirement for session binding in SBLP is equally valid in FBC. However for FBC there is no solution based on an authorization token, but the standard is rather vague leaving much to solve for the implementation.

In 3GPP Rel7, the concept of SBLP and FBC is merged into a common architecture called Policy and Charging Control, as seen in FIG. 3. The PDF and the CRF are merged into a single element called the Policy and Charging Rules Function (PCRF). Also the PEP and the TPF are merged into a logical function called the Policy and Charging Enforcement Function (PCEF). Finally the interfaces are merged in the following fashion:

Rel6 Gx+Rel6 Go into Rel7 Gx; and
Rel6 Rx+Rel6 Gq into Rel7 Rx.

While the requirement for session binding is clear, and in an environment hosting multiple PCRFs it would be required to have some mean for PCRF selection, the standard is still not clear. The problem of selecting the same PCRF for multiple sessions is escalated in 3GPP Rel8 for the Evolved Packet System (EPS), formerly known as System Architecture Evolution (SAE). FIG. 4 illustrates the EPS architecture for non-roaming 3GPP access using a Proxy Mobile IP (PMIP) based S5 interface. For this case, there is a need to bind S7c and S7 sessions (both protocols being based on Diameter Gx). In addition, there is an Rx interface that also requires binding to the S7 session.

FIG. 5 illustrates a roaming scenario for 3GPP access. In this scenario yet another interface is present called S9. In this case there is a need to find the right home-PCRF (hPCRF) and bind the S9 and S7 sessions in the hPCRF. The examples in FIG. 4 and FIG. 5 are just two examples out of many where mechanisms for PCRF discovery are required in 3GPP Rel8.

Disadvantageously, the principles for PCRF selection are currently not described in the 3GPP standard. A consistent mechanism for PCRF discovery is required in order to be able to do session binding for Rx and Gx sessions (Rel6 onwards) and for S7 and S9 sessions (Rel8 onwards). Current implementations are client based selection mechanisms based on proprietary algorithms. This is not efficient for several reasons, including, for O&M, re-configuring the PCRF network will imply that all clients will have to be updated; for interoperability, in a multi-vendor environment it is not certain that clients from different vendors will support the same proprietary mechanisms for PCRF selection; and for scalability, some operators can be expected to operate very large Diameter protocol networks in the future. Configuring PCRF selection as a distributed mechanism in the network is not likely to scale very well.

SUMMARY

It is an object of the present invention to remedy the disadvantages described above. This is provided by, in a first embodiment of the present invention which is a method comprising the steps of: receiving, using a communication interface, a request from a UE for starting a Diameter session; performing a lookup in a local register or an external register for determining existing Diameter sessions; selecting a Diameter server or choosing a Diameter server; relaying the UE request to the Diameter server; receiving an answer from the Diameter server; and registering the server selection; and relaying the response from the Diameter server to the UE. The foregoing steps can be performed by a device comprising a communication interface, a processing unit, a memory unit, wherein the processing unit is arranged run instruction sets stored in the memory unit for performing the forgoing steps. The Diameter server may be a PCRF server. The relay agent may be arranged to be located in a core network part of the telecommunications network. The relay agent may be arranged to use at least one of an IP address, a MSISDN, or other ID defining and distinguishing the session.

A second embodiment of the present invention is a method for efficient handling of AAA services in a telecommunications network comprising the steps of: receiving a request from a UE for starting a Diameter session; performing a lookup in a local register or an external register for determining existing Diameter sessions; selecting a Diameter server or choosing a Diameter server; relaying request to the Diameter server; receiving an answer from the Diameter server; registering the server selection; and relaying the response from the Diameter server to the UE. The foregoing steps may be performed by a node in a telecommunications system. The method may further comprise a step of receiving requests from a plurality of UEs. If there already exists a registered Diameter session suitable for the request, the method may further comprise the step of relaying to the same Diameter server as already registered. In the second embodiment of the method of the present invention method, the step of selecting may be performed by at least one of choosing a registered server, arbitrarily choosing a server, controlled by an external entity, or choosing using a predefined algorithm.

A third embodiment of the present invention is a computer program stored on a computer readable medium for session biding and correlation, comprising instruction sets for: receiving a request from a UE for starting a Diameter session; performing a lookup in a local register or an external register for determining existing Diameter sessions; selecting a server or choosing a Diameter server; relaying request to the Diameter server; receiving an answer from the Diameter server; registering the server selection; and relaying the response from the Diameter server to the UE.

A fourth embodiment of the present invention is an infrastructure network in a telecommunications network, comprising: an interface to a radio access gateway; core network entities; and an AAA relay agent according to the first embodiment of the present invention in communication with at least one core network entity. In the fourth embodiment, the relay agent may be located outside the core network in a PCRF server.

These and other embodiments of the present invention will be apparent with reference to the embodiments described hereinafter.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
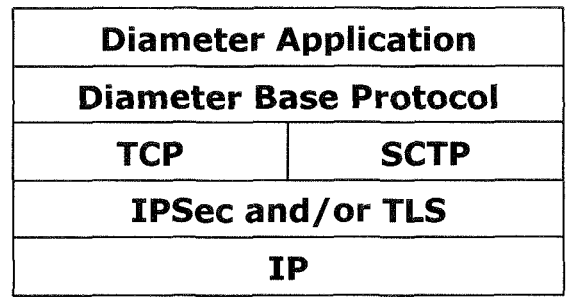
FIG. 1 illustrates schematically a Diameter protocol stack.
Figure 2:
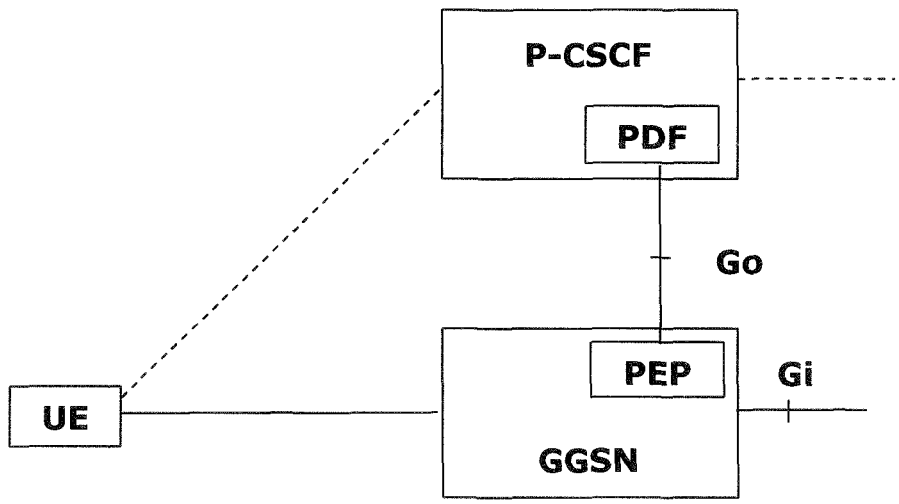
FIG. 2 illustrates schematically SBLP architecture.
Figure 3:
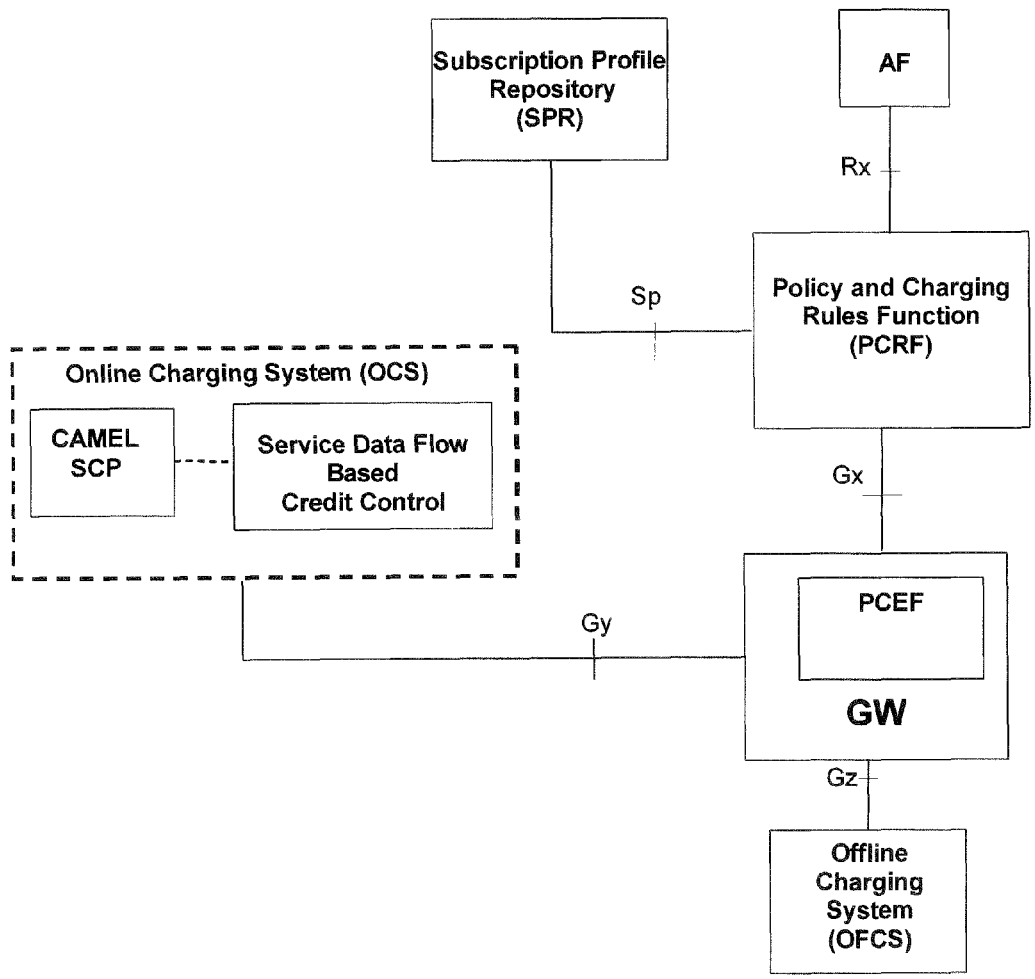
FIG. 3 illustrates schematically PCC architecture in 3GPP (Rel7)
Figure 4:
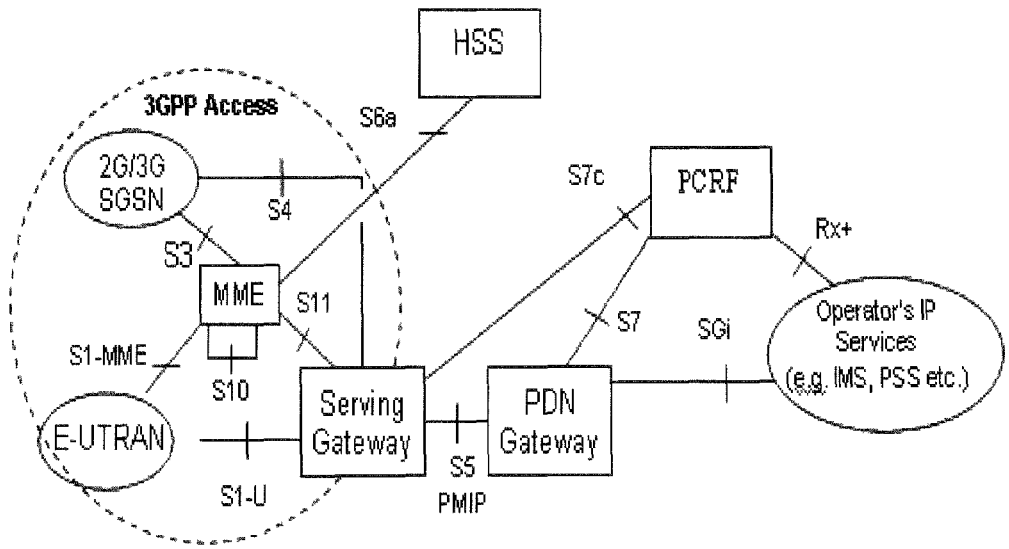
FIG. 4 illustrates schematically non roaming architecture for 3GPP access within EPS using PMIP based s5.
Figure 5:
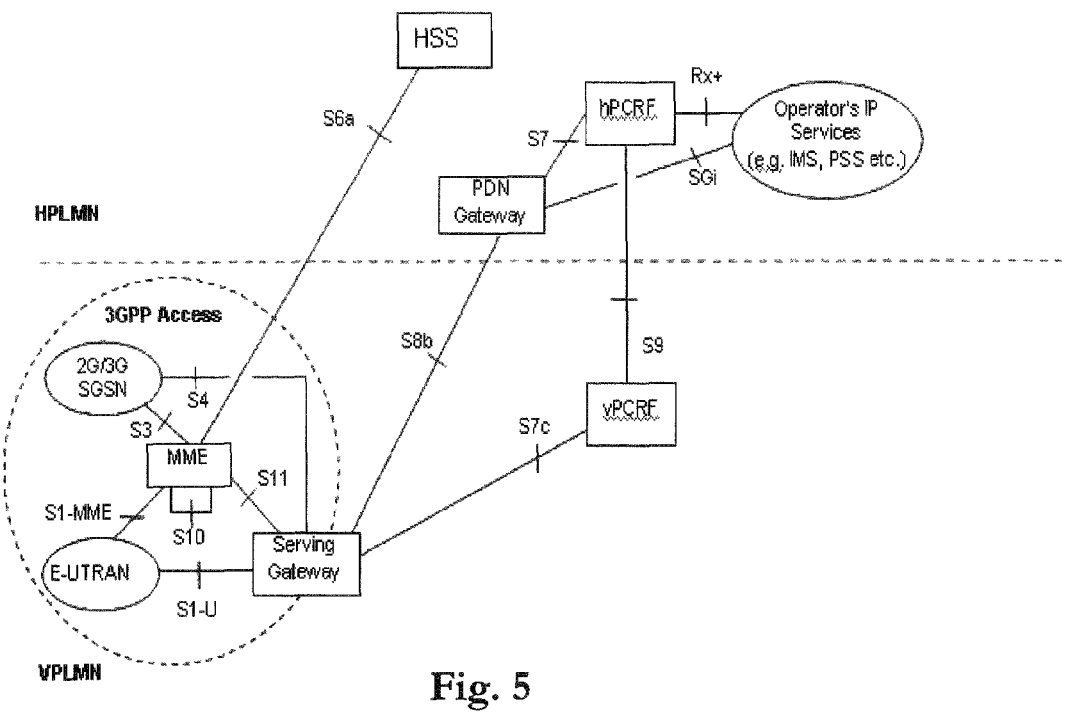
FIG. 5 illustrates schematically roaming architecture for 3GPP accesses within EPS using S8b.
Figure 6:
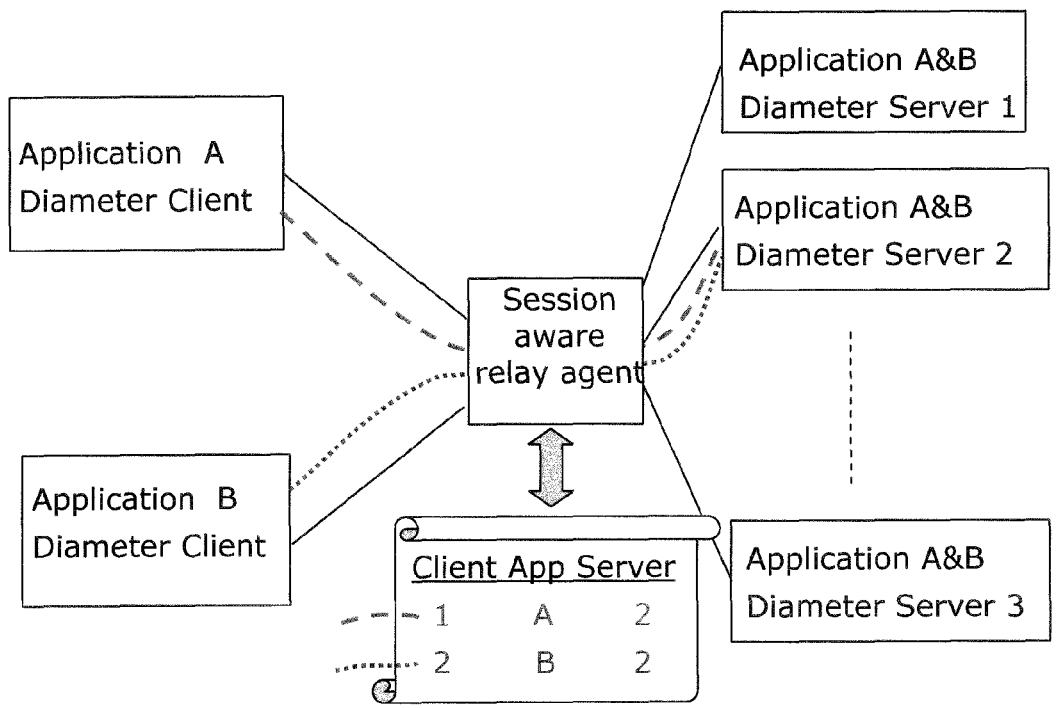
FIG. 6 illustrates schematically, an embodiment of the present invention.

As seen in FIG. 6, the present invention uses session aware Diameter agents that support multiple applications to correlate sessions that requires binding and then to relays them to the same Diameter server (PCRF). This puts several requirements on the agent. First of all the agent would have to be aware and keep track of all Diameter sessions for the different applications that require session binding. Second it would require from the agent to be able to correlate session information and then to relay requests from different applications (and clients) to the same Diameter server (PCRF). The agent could use any suitable parameter for example, an IPv4/IPv6-address, or MSISDN, as key for the session correlation defining and distinguishing the session. All initial requests would have to go through this agent. When a request is received at the agent peer then the agent would: (1) Perform a lookup in a register to see if there are already any existing sessions for the same or for other Diameter applications that has been relayed or redirected to a server (PCRF) and that requires session binding; (2a) If there is, then the new request is relayed to the same PCRF and the session data is saved in the register (such as the end user Id, Client-ID, Application-ID, PCRF-ID) (the lookup and registration procedure may be an internal procedure to an internal register, but it may also involve interaction with an external database over an interface. It is possible that a group (cluster) of Diameter servers share the same memory resources. In that case the agent could relay the session to any available server in the cluster); (2b) If there is not, then the agent selects a server (PCRF) based on an arbitrary mechanism (the mechanism for selecting the PCRF is not within the scope of the present invention. It may be an internal mechanism or it may involve interaction over an external interface). The request is then relayed to the selected server (PCRF) and finally the agent stores the new session information into the register; (3) When the session is terminated then the entry in the register is removed.

Figure 7:
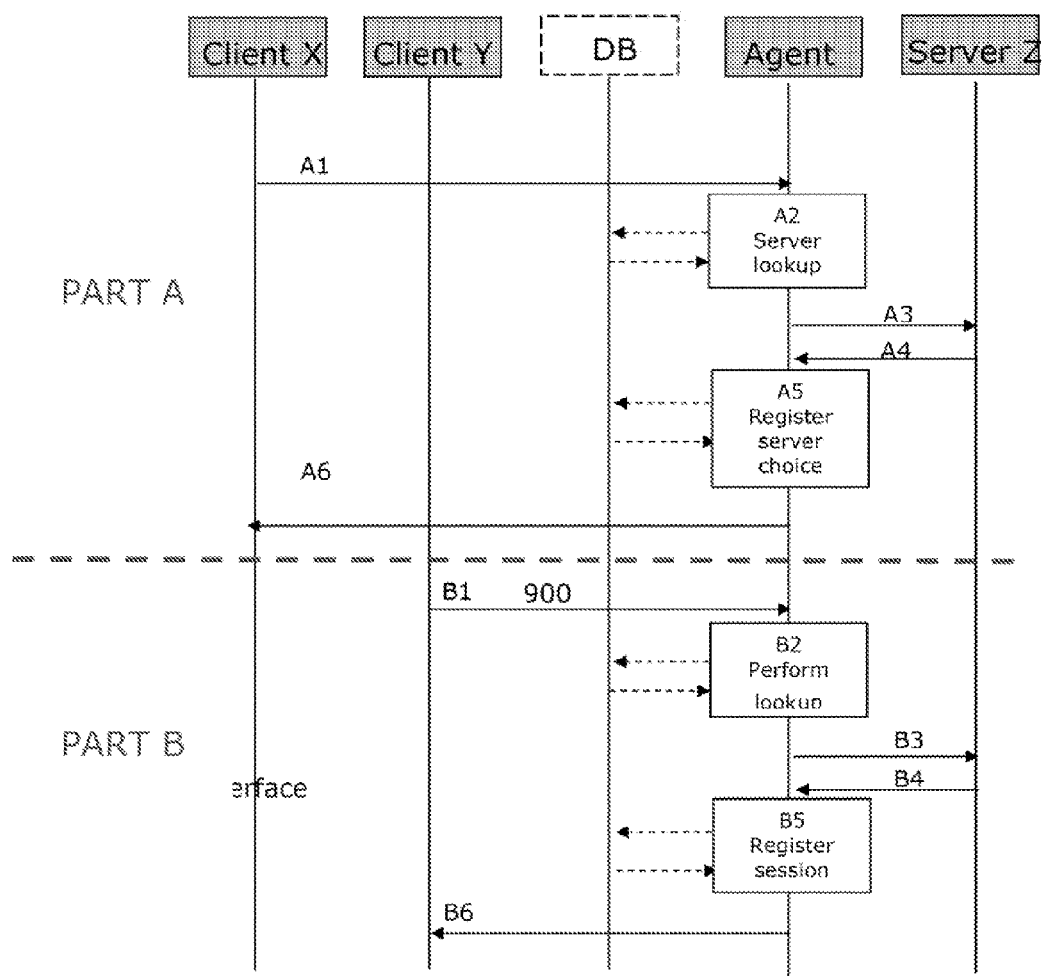
FIG. 7 illustrates schematically a functional overview for session setup according to the present invention.

The following functionality may be applied to any two (or more) Diameter applications that require the clients to contact the same server, or cluster of servers, in order to achieve session binding. FIG. 7 is a message flow illustrating the correlation process between two Diameter sessions at session establishment.

A1. Client X starts a new Diameter session and sends an initial Diameter Request. The request is populated with parameters for session binding.

A2. The agent peer receives the request and first performs a lookup in the register by using one of the parameters in the received message as key (identity). This lookup could be internal in case the register is located in the same element as the agent, but it could also involve communication over an external interface in case the register (database) is external. In case the identity is unknown and there are no known Diameter sessions towards a server for that identity, then a server is selected. The server selection could be based on an (arbitrary) internal algorithm but it could also be a decision made by an external node communicated to the agent over an interface.

A3. The initial request is relayed to the target server.

A4. The target server processes the request and answer with a Diameter response.

A5. The agent registers the server selection as successful. The registration can be internal or involve communication over an external interface. In case the Initial request to the server fails, then the agent may re-select a server and re-send the initial request towards a new target server.

A6. The initial response is relayed to Client X.

B1. Client Y starts a new Diameter session and sends an initial Diameter Request. The application could be the same as the application used between Client X and Server Z, but it could also be a different one. The request is populated with parameters for session binding.

B2. The agent peer receives the request and first performs a lookup of the provided identity in the register. This lookup could be internal in case the register is located in the same element as the agent, but it could also involve communication over an external interface in case the register (database) is external. Because there is already a session towards a server for this identity the same server is selected also for this session.

B3. The initial request is relayed to the target server.

B4. The target server processes the request (binds the sessions) and answer with a Diameter response.

B5. The agent registers the session.

B6. The initial response is relayed to Client Y.

When any of the Diameter sessions are terminated, then the agent removes the associated entry in the register. When the last session related entry associated with an identity has been removed from the register, then the association to the selected server is also removed. This means that the next time that a new Diameter session is initiated for the same identity, a new server may be selected for that session.

Figure 8:
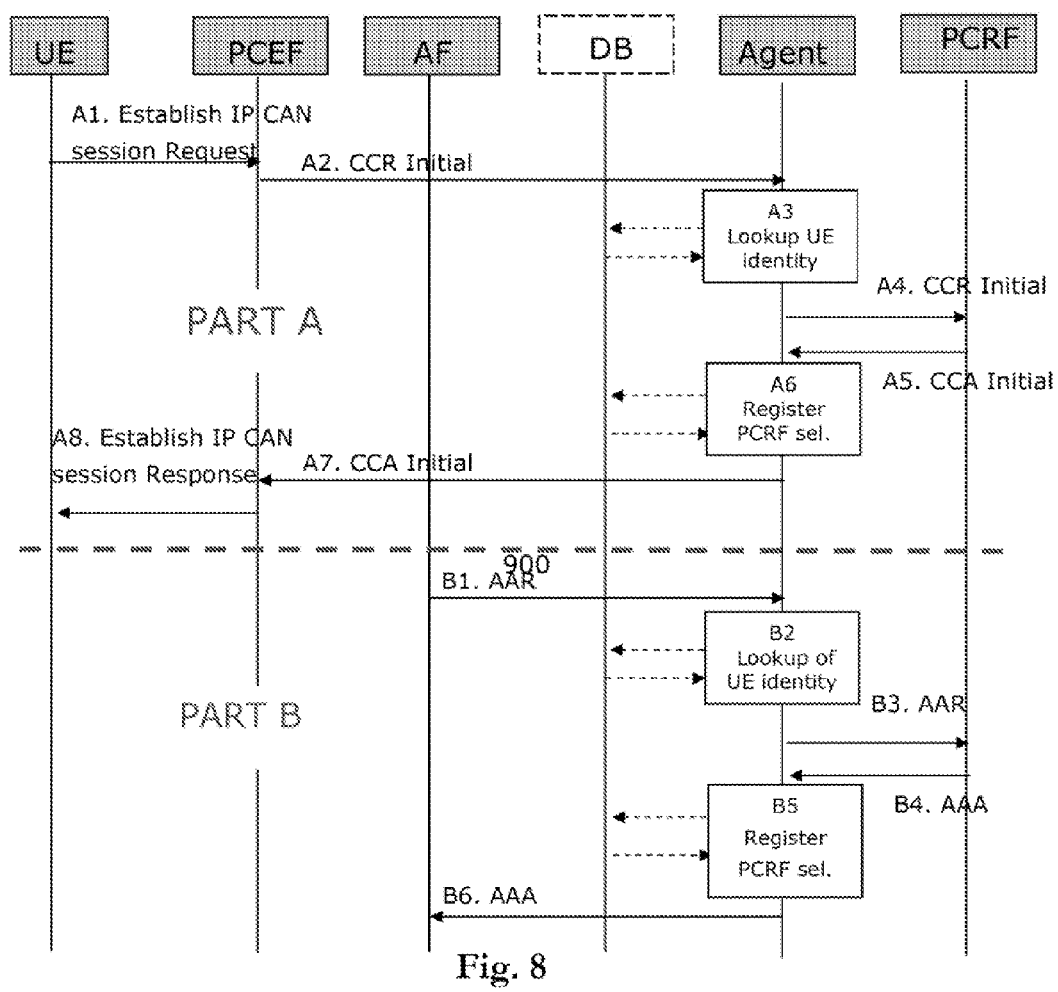
FIG. 8 illustrates schematically PCRF selection based on session correlation in a relay agent for Rel7 Gx and Rx according to the present invention.

FIG. 8 illustrates an example of how the present invention is used to solve PCRF discovery for 3GPP Rel7 Gx and Rx.

A1. The PCEF (GW) receives an Establish IP-CAN Session Request. The form of the Establish IP-CAN Session Request depends upon the type of the IP-CAN. For GPRS, the GGSN receives the first Create PDP Context Request within a PDP session. For 1-WLAN, the GW receives an IPSec tunnel establishment request.

A2. The GW starts a new DCC session by sending a CCR using the CC-Request-Type AVP set to the value INITIAL_REQUEST. The GW provides UE identity information and/or the UE IPv4 address or UE IPv6 address prefix. For types of IP-CAN, where the PCRF can be in control of IP-CAN Bearers, e.g. GPRS, the GW also provides a new bearer identifier and information about the requested bearer, such as QoS. It will also provide information about the Network Request Support and UE preferred Bearer Control Mode, if available.

A3. The agent peer receives the request and first performs a lookup of the UE identity in the register. This lookup could be internal in case the register is located in the same element as the agent, but it could also involve communication over an external interface in case the register (database) is external. In case the UE is unknown and there are no known Diameter sessions towards a PCRF, then a PCRF is selected. The PCRF selection could be based on an (arbitrary) internal algorithm but it could also be a decision made by an external node communicated to the agent over an interface.

A4. The CCR Initial is relayed to the target PCRF.

A5. The target PCRF stores the information received in the Diameter CCR. The PCRF also selects or generates PCC Rule(s) to be installed.

The PCRF may make a policy decision by deriving an authorized QoS and by deciding whether service flows described in the PCC Rules are to be enabled or disabled.

A6. The agent registers the PCRF selection as successful. The registration can be internal or involve communication over an external interface. In case the Initial request to the PCRF fails, then the agent may re-select a PCRF and re-send the request towards a new target PCRF.

A7. The CCA Initial is relayed to the PCEF.

A8. The GW sends a response to the Establish IP-CAN Session Request.

The procedure described in the second part of FIG. 8 describes the signaling flow when a new Application Function (AF) session is established.

B1. The AF receives an internal or external trigger to set-up of a new AF session and provides Service Information. The AF identifies the Service Information needed (e.g. IP address of the IP flow(s), port numbers to be used, information on media types, etc.). The AF identifies the Service Information needed and collects this information in a Diameter AAR for a new Rx Diameter session.

B2. The agent peer receives the request and first performs a lookup of the UE identity in the register. This lookup could be internal in case the register is located in the same element as the agent, but it could also involve communication over an external interface in case the register (database) is external. Since there is already a Gx session towards a PCRF for this UE the same RCRF is selected also for the Rx session.

B3. The CCR Initial is relayed to the target PCRF.

B4. The PCRF identifies the affected established IP-CAN Session(s) using the information previously received from the GW and the Service Information received from the AF. The PCRF sends a Diameter AAA to the AF.

B5. The agent registers the PCRF selection as successful.

B6. The AA is relayed to the AF.

An advantage of the present invention is that it solves and efficiently removes all responsibility on Diameter server selection required for session binding from the client side. PCRF addressing in PCC can simply be based on Realm-Name. This efficiently concentrates all functions related to session binding and PCRF selection to one agent, or a group of agents sharing the same database, per Realm. Hence, the present invention harmonizes well with the fundamental principles of the Diameter Base Protocol.

The present invention has advantages with respect to scalability and Operations and Maintenance (O&M) as any changes in the network will only impact the entity that implements the correlating function.

If the register that holds the session information is made external and thus accessible to/shared by multiple agents, then the present invention is very suitable with regard to agent redundancy and scalability; Additional agents could easily be introduced into the system and standard Diameter functionality for peer failover to secondary agent peers can be used in case one of the agents is removed (i.e. taken offline for maintenance or as a result of system failure).

Figure 9:
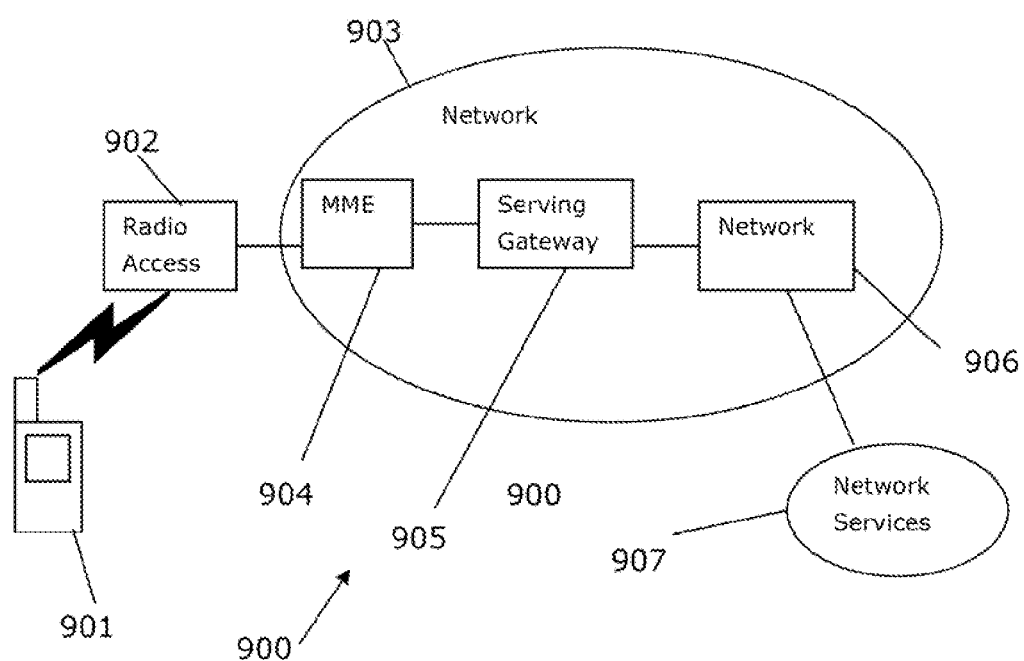
FIG. 9 illustrates schematically a network according to the present invention.

Referring now to FIG. 9, a wireless telecommunications network being a UE 901 and network 903 according to the present invention is provided therein. The network 903 further comprises a radio access entity 902, a mobility management entity 904, a serving gateway 905, and other services provided in the network 906. The network 903 can be connected to external network services (e.g. Internet) and/or external communication network services 907 (e.g. operators IP services, and Home location services). UE 901 can connect to the radio access entity 902 using any suitable wireless communication solution supported by the radio access entity, such as but not limited to 2G and 3 G communication based systems, and WLAN services, e.g., according to IEEE 802.11 series of communication standards, or WPAN services, such as Bluetooth.

Figure 10:
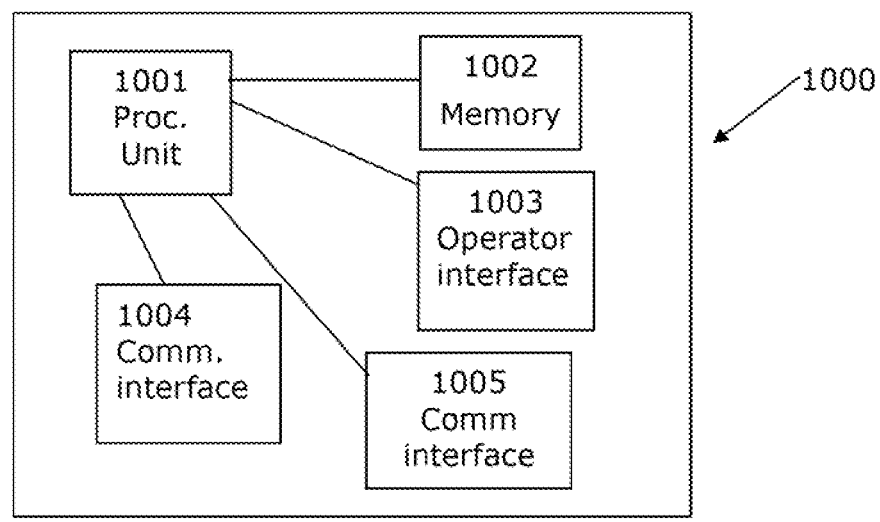
FIG. 10 illustrates schematically an infrastructure device according to the present invention.

FIG. 10 illustrates a device 1000 (agent) that handles the Diameter agent according to the present invention. The device has at least one processing unit 1001, at least one memory unit 1002, being volatile and/or non-volatile, such as but not limited to, a register, RAM, ROM, EEPROM, DRAM, Flash, or hard disk, an operator interface unit 1003, at least one communication interface 1004 and 1005. The processing unit is arranged to run instruction sets stored as software in the memory unit, e.g., a computer readable storage medium, or available as hardware e.g., in an field programmable gate array (FPGA) or application specific integrated circuit (ASIC). The device may include other units as well. The memory unit is adapted to store software implementing the present invention. The device further includes a dedicated long time storage unit which may removable or non-removable, such as, but not limited to a DVD, CD, BluRay, HDD, hard disk, or magnetic tape. The device can communicate with a controlling device for updates and similar control features. This is done using either the communication interface or a separate control communication interface. The device 1000 may further be arranged to operate other functionality of the communications network depending on where the agent is implemented in the network architecture.

Figure 11:
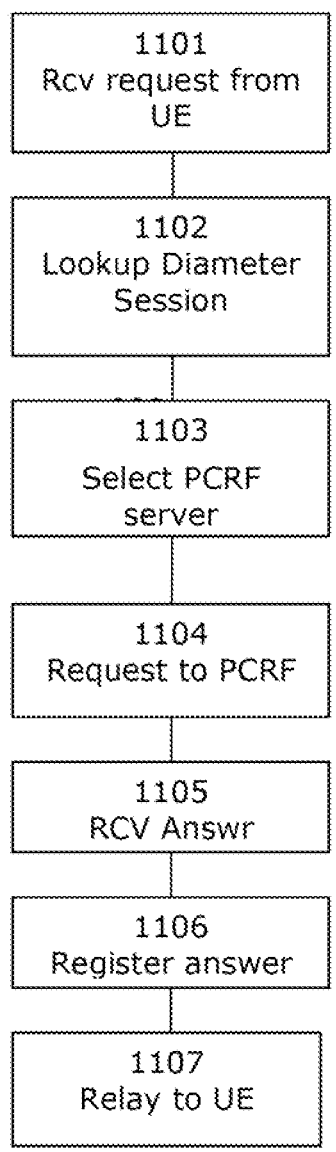
FIG. 11 illustrates schematically a method according to the present invention.

FIG. 11 shows a method in the infrastructure device (agent) according to the present invention: The steps are as follows:

1101. Receiving a request from a UE for starting a Diameter session;

1102. Performing a lookup in a local register or an external register for determination of existing Diameter session;

1103. Selecting a Diameter server, such as a PCRF server, or choosing a Diameter server, such as a PCRF server;

1104. Relaying request to the Diameter server, such as a PCRF server;

1105. Receiving an answer from the Diameter server, such as a PCRF server;

1106. Registering the server selection;

1107. Relaying the response from the Diameter server, such as a PCRF server, to the UE.

Note that the logical agent element described in the present invention could be implemented as a stand alone system or at the same physical platform as a PCRF. Also note that the present invention is generally applicable to all Diameter based applications, not only those related to PCC, that require sessions from different clients and/or different applications to be correlated and relayed to the same server for binding reasons.

It should be noted that even though the present invention has been exemplified with the protocol Diameter, the present invention is not limited to this protocol but is applicable to other similar protocols which can handle Authentication, Authorization and Accounting in telecommunications network. Further, the event of emergency communication other solutions may be used depending on network configuration and communication setup. Furthermore, it should be appreciated that for certain situations, billing functionality can be integrated into the present invention.

As used herein, the word "comprising" does not exclude the presence of other elements or steps than those listed and the words "a" or "an" preceding an element do not exclude the presence of a plurality of such elements. Further, any reference signs do not limit the scope of the claims, that the invention may be at least in part implemented by means of both hardware and software, and that several "means" or "units" may be represented by the same item of hardware. The above mentioned and described embodiments are given as examples of the present invention and are not be limited to the present invention.

The invention claimed is:

1. A method for efficient handling of Authentication, Authorization and Accounting (AAA) services in a telecommunications network, the method comprising:
a relay agent:
receiving, using a communication interface, a Diameter protocol request from a Diameter client for starting a Diameter session, wherein the Diameter protocol request complies with a Diameter protocol;
in response to the Diameter client request, performing a lookup for determining existing Diameter sessions in a register;
selecting a Policy and Charging Rules Function (PCRF) server from among a plurality of PCRF servers if no existing Diameter session suitable for the requested Diameter session is found in the register;
relaying the Diameter client request to the PCRF server;
receiving an answer from the PCRF server;
registering the PCRF server selection in the register;
relaying the answer from the PCRF server to the Diameter client;
supporting multiple applications to correlate the requested Diameter session with one or more other subsequently requested Diameter sessions that require binding; and
relaying the correlated Diameter sessions to the same PCRF server selected for the requested Diameter session.

2. The method of claim 1, wherein the performing a lookup for determining existing Diameter sessions is performed in a local register.

3. The method of claim 1, wherein the performing a lookup for determining existing Diameter sessions is performed in an external register.

4. The method of claim 1, wherein the Diameter server is located in a core network part of the telecommunications network.

5. The method of claim 1, using at least one of an Internet Protocol (IP) address, a Mobile Subscriber Integrated Services Digital Network Number (MSISDN), and other identification defining and distinguishing the session to determine whether to correlate the sessions.

6. The method of claim 1, further comprising receiving requests from a plurality of Diameter clients.

7. The method of claim 1, further comprising:
if there already exists a registered Diameter session suitable for the Diameter client request relaying the client request to the same Diameter server that was selected for the existing registered Diameter session.

8. The method of claim 1, wherein the selecting is performed by at least one of choosing a registered server, arbitrarily choosing a server, controlled by an external entity, and choosing using a predefined algorithm.

9. The method of claim 1, wherein the Diameter client is a Proxy Call State Control Function (P-CSCF).

10. A relay agent in a telecommunications network, comprising:
a communication interface;
a processing unit coupled to the communication interface; and
a memory unit coupled to the processing unit, the processing unit is configured to run instruction sets stored in the memory unit to:
receive, using the communication interface, a request from a Diameter protocol client for starting a Diameter session, wherein the request complies with a Diameter protocol,
in response to the Diameter client request, perform a lookup in one of a local register and an external register for determining existing Diameter sessions;
select a PCRF server from among a plurality of PCRF servers if no existing Diameter session suitable for the requested Diameter session is found by the lookup,
relay the Diameter client request to the PCRF server,
receive an answer from the PCRF server,
register the PCRF server selection;
relay the answer from the PCRF server to the Diameter client, the relay agent being session aware;
support multiple applications to correlate the requested Diameter session with one or more other subsequently requested Diameter sessions that require binding; and
relay the correlated Diameter sessions to the same PCRF server selected for the requested Diameter session.

11. The relay agent according to claim 10, wherein the agent is configured to be located in a core network part of the telecommunications network.

12. The relay agent according to claim 10, configured to use at least one of an IP address, a Mobile Subscriber Integrated Services Digital Network Number (MSISDN), other identification defining and distinguishing the session to determine whether to correlate the sessions.

13. The relay agent according to claim 10, wherein the Diameter client is a P-CSCF.

14. A computer system in a telecommunications network comprising a processor and an associated memory, storing instructions for session binding and correlation, that when the instructions are executed cause the computer system to:
receive a request from a Diameter protocol client for starting a Diameter session, wherein the request complies with a Diameter protocol;
in response to the Diameter client request, perform a lookup in one of a local register and an external register for determining existing Diameter sessions;

select a PCRF server from among a plurality of PCRF servers if no existing Diameter session suitable for the requested Diameter session is found by the lookup;
relay the Diameter client request to the PCRF server;
receive an answer from the PCRF server;
register the PCRF server selection;
relay the answer from the PCRF server to the Diameter client, the computer system being session aware;
support multiple applications to correlate the requested Diameter session with one or more other subsequently requested Diameter sessions that requires binding; and
relay the correlated Diameter sessions to the same PCRF server selected for the requested Diameter session.

15. An infrastructure network, comprising:
an interface to a radio access gateway;
at least one core network entity;
an Authentication, Authorization and Accounting (AAA) relay agent in communication with at least one core network entity, the relay agent being configured to:
    receive, using the communication interface, a Diameter protocol request from a Diameter client for starting a Diameter session, wherein the Diameter protocol request complies with a Diameter protocol;
    in response to the Diameter client request, perform a lookup in one of a local register and an external register for determining existing Diameter sessions;
    select a PCRF server from among a plurality of PCRF servers if no existing Diameter session suitable for the requested Diameter session is found by the lookup;
    relay the Diameter client request to the Diameter server;
    receive an answer from the Diameter server;
    register the PCRF server selection;
    relay the answer from the PCRF server to the Diameter client, the AAA relay agent being session aware;
    support multiple applications to correlate the requested Diameter session with one or more other subsequently requested Diameter sessions that require binding; and
    relay the correlated Diameter sessions to the same PCRF server selected for the requested Diameter session,
    wherein said infrastructure network is in a telecommunications network.

16. The infrastructure network of claim 15, wherein the agent is located outside the core network in one of the PCRF servers.

17. The infrastructure network of claim 15, wherein the agent is located in the core network.

* * * * *